Feb. 15, 1938.  O. K. KJOLSETH  2,108,676
OSCILLATION RESTRAINT MECHANISM FOR LOCOMOTIVES OR CARS
Filed July 30, 1935
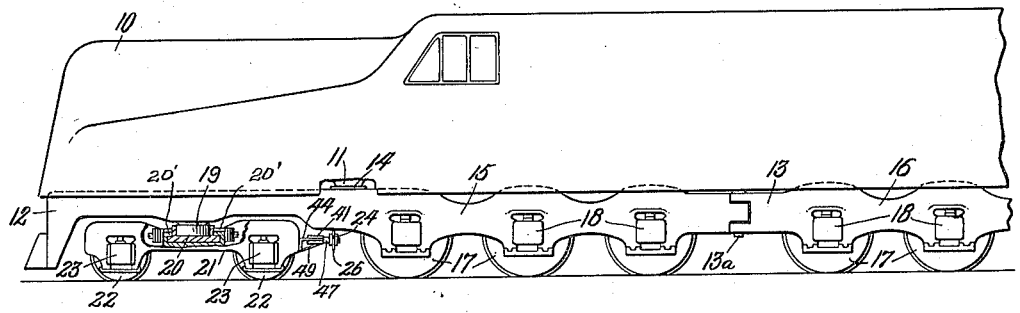
Inventor:
Ole K. Kjolseth,
by Harry E. Dunham
His Attorney.

Patented Feb. 15, 1938

2,108,676

UNITED STATES PATENT OFFICE 2,108,676

OSCILLATION RESTRAINT MECHANISM FOR LOCOMOTIVES OR CARS

Ole K. Kjolseth, Erie, Pa., assignor to General Electric Company, a corporation of New York Application July 30, 1935, Serial No. 33,849

11 Claims. (Cl. 105—174)

My invention relates to an oscillation restraint mechanism for locomotive or car guiding trucks and, more particularly, to an oscillation restraint mechanism adapted to restrain oscillation of a guiding truck about its center plate.

In constructing locomotives or cars, pivoted guiding or auxiliary trucks are usually provided to resist swaying or nosing of the platform structure or supporting frame at high speeds, and also to facilitate traversing a curve in the track by exerting a turning moment on the front end of the frame. Restraining devices have been used on these guiding trucks which tend to maintain the wheels of the truck in alignment with the frame and the other wheels of the locomotive or car. Such devices have generally included springs and lever mechanisms arranged to resist turning of the guiding truck on its supports in rounding a curve and to return them to a position with the wheels in alignment with the rails and the other wheels when the locomotive or car traverses a straight portion of the track. These restraining devices generally have not entirely suppressed swaying or nosing of the locomotive or car at high speeds, because when the trucks are turned out of alignment with each other the force exerted by the springs tending to return them to an aligned position, accelerates their movement and causes them to swing past this position and oscillate relative to the frame of the locomotive or car about the truck center plate before coming to rest.

An object of my invention is to provide an improved mechanism for restraining oscillation of a guiding or auxiliary truck.

Further objects and advantages of my invention will become apparent from the following description referring to the accompanying drawing and the features of novelty which characterize my invention will be pointed out with particularity in the claims appended to and forming a part of this specification.

For a better understanding of my invention, reference is made to the accompanying drawing wherein Fig. 1 is a side elevation of a locomotive embodying my invention; Fig. 2 is a plan view of an embodiment of my improved oscillation restraint mechanism applied to the end of a guiding truck frame; Fig. 3 is a sectional view on the line 3—3 of Fig. 2; Fig. 4 is a view on the line 4—4 of Fig. 3 showing a portion of the locomotive frame structure in section; and Fig. 5 is a partially exploded perspective view of the elements of an embodiment of my improved universal joint.

Referring to the drawing, an electric locomotive superstructure 10 is supported by center pins on main frames 12 and 13 of similar construction, which are pivotally connected together at 13a. The side frames 15 of the main frame 12 are rigidly connected together by cross members including a bolster 14 on which one end of the superstructure is supported on a center pin 11. The locomotive is propelled by driving wheels 17 through axles journaled in journal boxes 18 on which the side frames 15 and 16 of the main frames 12 and 13 are supported. To facilitate traversing curves in the track, the outer end of the main frame is supported upon a pivoted guiding or auxiliary truck by a center pin 19 laterally movable with respect to the guiding truck and carried by a guiding truck center plate 20 supported on the truck frame 21. The center pin 19 is restrained against lateral oscillation by a lateral restraint device 20', which may be of the type disclosed in my Patent 2,014,970, September 17, 1935, or any other suitable arrangement. If desired, the center pin 19 may be resiliently restrained against movement from its central position on the center plate 20. The guiding truck is of the double axle type provided with wheels 22 mounted on axles journaled in journal boxes 23 which support the guiding truck frame 21.

The inner end of the guiding truck is connected to the main supporting frame by an oscillation restraint mechanism in which a radius rod secured to the truck is restrained against lateral movement, is longitudinally and vertically translatable, and provides a universal joint between the end of the guiding truck and the bolster 14 of the main locomotive frame 12. This universal joint is secured to the bolster 14 against relative longitudinal movement by a bracket 24 which is attached to the bolster by bolts 25. The bracket is provided with vertically extending guide supports 26, which are interconnected by a tie bar 27 fastened to the lower extremities of the guide supports by bolts 28. In order to reinforce the guide supports 26 against lateral movement, they are welded to the bolster 14, as indicated at 29. Vertically extending parallel guides 30 are secured to the guide supports by bolts 31. A yoke 32 is provided with vertically extending parallel guideways 33 slidably engaging the guides 30 to provide a vertically translatable connection restraining lateral movement with respect to the bolster 14. These guideways are provided with laterally extending flanges 34 having parallel inner surfaces extending at right angles to the faces of the guide shoes 30. These surfaces are chamfered from the central parallel surface toward each end, as indicated at 35, and engage the ends of the guides 30 to provide a vertically pivotal connection between the yoke 32 and the guides. The yoke 32 is provided with internal vertically extending arcuate bearing surfaces 36, and the sides of the yoke are connected at their upper ends by the upper portion of the yoke 32, and at the lower ends thereof by a tie plate 37 welded thereto. A bearing block 38 provided with arcuate surfaces 39 is rotatably fitted within the yoke bearing surfaces 36. The bearing block 38 also is provided with a longitudinally extending cylindrical opening 40 of slightly smaller diameter than the openings 36a between the arcuate bearing surfaces 36 of the yoke 32.

The oscillation restraint mechanism is connected to the truck frame 21 by a rocker pin 41 having a slot 42 in the end thereof, and welded at 43 to an angle bar 44 interconnecting the side frames 21 of the guiding truck. The angle bar 44 is also rigidly secured to the guiding truck tie bar 45 by a reinforcing plate 46, which is welded to each of these bars. The rocker pin 41 is provided with a cylindrical portion 47, which is longitudinally slidable and rotatably fitted within the longitudinally extending cylindrical opening 40 in the bearing block 38, so as to provide a nonload transferring connection between the guiding truck and the main supporting frame which is rotatable about a vertically extending axis and a horizontally extending axis. In order to more rigidly secure the rocker pin 41 with respect to the guiding truck frame, gusset plates 48 and 49 are welded to the sides and bottom, respectively, of the rocker pin and to the angle bar 44.

In order to properly lubricate the various bearing surfaces of the universal joint, the upper portion of the yoke 32 is provided with an oil hole 50, which communicates with a corresponding oil hole 51 formed in the upper portion of the bearing block 38 and communicating with the longitudinally extending cylindrical bearing 40 and with an oil groove 52 which communicates with the vertically extending arcuate bearing surfaces 39. Such an arrangement provides a lubricant passage which is readily accessible from the exterior of the yoke and is conveniently located for lubricating the bearing surfaces of the oscillation restraint mechanism.

When the locomotive or car passes over irregularities in the track, the wheels 22 of the guiding truck pass over these irregularities before the driving wheels 17 and, consequently, the frame 21 of the guiding truck tends to move vertically with respect to the main supporting frame 12, and also tends to pivot vertically about the radius bar connection. The yoke 32 of my improved oscillation restraint device is vertically translatable and vertically tiltable with respect to the stationary bracket 24 about the guides 30 and, thus, prevents the transmission of strains between the guiding truck and the main frame bolster 14 when relative vertical movement occurs between these parts. When the wheels 22 of the guiding truck pass over these irregularities in the track, the guiding truck may also sway slightly with respect to the main supporting frame 12. In order to provide for this swaying movement, my improved radius bar is provided with the cylindrical rocker bar 47 rotatably fitted in the cylindrical bearing opening 40 of the bearing block 38 and thereby provides against the transmission of strains under these conditions. When the locomotive or car traverses curves in the track, the guiding truck enters the curved section before the driving wheels and, consequently, tends to pivot laterally about the connection of the radius rod 41 to the bolster 14 of the main supporting frames. In order to provide for this pivotal movement, the center pin 19 is laterally slidable on the guiding truck center plate 20, and the bearing block 38 has been provided with the arcuate bearing surfaces 39 rotatably fitted in the arcuate bearing surfaces 36 of the yoke 32. When the guiding truck tends to pivot about the radius bar, the distance between the center pin 19 and the connection of the radius bar to the bracket 24 tends to vary slightly. In order to provide for this relative longitudinal movement, the rocker pin 47 is slidably fitted in the bearing block 38, and provides a longitudinally translatable nonload transmitting connection between the guiding truck frame and the bolster 14. Thus, it is seen that I have provided a vertically and longitudinally translatable universal joint between an end of the guiding or auxiliary truck and the main supporting frame which co-operates with a laterally movable center plate to provide an improved pivotally connected guiding or auxiliary truck, and provides against the transmission of strains between the truck and the main frame when the locomotive or car traverses a curve or irregularities in the track. This joint provides a laterally nontranslatable connection between an end of the guiding truck and the main supporting frame 35 and thereby co-operates with the center plate support to restrain oscillations of the guiding truck about its center plate.

While I have illustrated and described a particular embodiment of my invention, modifications thereof will occur to those skilled in the art. I desire it to be understood, therefore, that my invention is not to be limited to the particular arrangement disclosed and I intend, in the appended claims, to cover all modifications which do not depart from the spirit and scope of my invention.

What I claim as new and desire to secure by Letters Patent of the United States, is:—

1. In combination with a locomotive or car having a main supporting frame, an auxiliary truck having a truck frame, laterally movable means for supporting said main supporting frame on said auxiliary truck, a truck oscillation restraint mechanism including a universal joint, means including a bracket for securing said universal joint to said supporting frame, said bracket having vertically extending guides, said universal joint including a yoke having guideways arranged to engage said bracket guides, means including chamfered flanges on said yoke arranged to engage said bracket guides for providing a pivotal connection therebetween, arcuate bearings formed in said yoke, a bearing block rotatably fitted within said arcuate bearings, a longitudinally extending bearing in said bearing block, a rocker pin for said universal joint constructed and arranged to have a rotatable and longitudinally slidable engagement with said longitudinally extending bearing in said bearing block, and means for rigidly securing said rocker pin to an end of said truck frame.

2. In combination with a locomotive or car having a main supporting frame, an auxiliary truck having a truck frame, laterally movable means for supporting said supporting frame on said auxiliary truck, a truck oscillation restraint mechanism including a universal joint, means including a bracket for laterally restraining movement of said universal joint with respect to said supporting frame, vertically extending guides secured to said bracket, said universal joint including a yoke having guideways arranged to engage said guides, means including chamfered flanges on said yoke arranged to engage said bracket guides for providing a pivotal connection therebetween, vertically extending arcuate bearings formed in said yoke, openings between said arcuate bearings, a bearing block for said universal joint having bearing surfaces rotatably fitted within said arcuate bearings, a longitudinally extending bearing formed in said bearing block, a rocker pin for said universal joint constructed and arranged so as to have a rotatable and longitudinally slidable engagement with said bearing in said bearing block, and means for rigidly securing said rocker pin to an end of said truck frame.

3. A locomotive or car having a superstructure, main side frames, a bolster extending between and connected to said side frames, means for supporting said superstructure on said bolster, an auxiliary truck having a truck frame, laterally movable means for supporting said side frames on said auxiliary truck, an oscillation restraint mechanism including a universal joint, means including a bracket for securing said universal joint to said bolster, said bracket having vertically extending guides, said universal joint including a yoke having guideways arranged to engage said bracket guides, means including chamfered flanges on said yoke arranged to engage said bracket guides for providing a pivotal connection therebetween, arcuate bearings formed in said yoke, openings between said arcuate bearings, a bearing block for said universal joint having bearing surfaces rotatably engaging said arcuate bearings, a cylindrical bearing formed in said bearing block, a rocker pin for said universal joint constructed and arranged so as to have a longitudinally slidable and rotatable engagement with said bearing in said bearing block, and means for rigidly securing said rocker pin to an end of said truck frame.

4. A locomotive or car having a superstructure, main side frames, a bolster extending between and connected to said side frames, means for supporting said superstructure on said bolster, an auxiliary truck having a truck frame, laterally movable means for supporting said side frames on said auxiliary truck, an oscillation restraint mechanism including a universal joint, means including a bracket for securing said universal joint to said bolster, said bracket having vertically extending guides, said universal joint including a yoke having guideways arranged to engage said guides, means including laterally extending flanges on said yoke chamfered toward each end thereof arranged to engage said guides for providing a pivotal connection therebetween, arcuate bearings formed in said yoke, longitudinally extending openings between said arcuate bearings, a bearing block for said universal joint having bearing surfaces arranged to rotatably engage said arcuate bearings, a longitudinally extending bearing in said bearing block, a rocker pin for said universal joint constructed and arranged so as to have a longitudinally slidable and rotatable engagement with said bearing in said bearing block, and means for rigidly securing said rocker pin to an end of said truck frame.

5. A locomotive or car having a superstructure, main side frames, a bolster extending between and connected to said side frames, means for supporting said superstructure on said bolster, an auxiliary truck having a truck frame, laterally movable means for supporting said side frames on said auxiliary truck, an oscillation restraint mechanism including a universal joint, means including a bracket for securing said universal joint to said bolster said bracket having vertically extending guides, said universal joint including a yoke having guideways arranged to engage said bracket guides, means including chamfered flanges on said yoke arranged to engage said bracket guides for providing a pivotal connection therebetween, arcuate bearings formed in said yoke, longitudinally extending openings between said arcuate bearings, a bearing block for said universal joint having bearing surfaces arranged to rotatably engage said arcuate bearings, a bearing in said bearing block, means for providing a lubricant passage from the exterior of said yoke and communicating with said arcuate bearings in said yoke and with said bearing in said bearing block, a rocker pin for said universal joint constructed and arranged so as to have a longitudinally slidable and rotatable engagement with said bearing in said bearing block, and means for rigidly securing said rocker pin to an end of said truck frame.

6. A locomotive or car having a superstructure, main side frames, a bolster extending between said side frames, means for supporting said superstructure on said bolster, an auxiliary truck having a truck frame, laterally movable means for supporting said side frames on said auxiliary truck, an oscillation restraint mechanism including a universal joint, means including a bracket for restraining said universal joint against lateral movement with respect to said bolster, said bracket including vertically extending guide supports, guides secured to said guide supports, said universal joint including a yoke having guideways arranged to engage said guides, means including laterally extending flanges on said yoke chamfered toward each end and arranged to engage said guides for providing a pivotal connection between said guides and said guideways, vertically extending arcuate bearings formed in said yoke, longitudinally extending openings between said bearings, a bearing block for said universal joint having bearing surfaces arranged to rotatably engage said arcuate bearings, a longitudinally extending bearing in said bearing block, a rocker pin for said universal joint constructed and arranged so as to have a longitudinally slidable and rotatable engagement with said longitudinally extending bearing, and means including brace plates secured to said rocker pin and to said truck frame for rigidly securing said rocker pin to an end of said truck frame.

7. A locomotive or car having a superstructure, main side frames, a bolster extending between said side frames, means for supporting said superstructure on said bolster, an auxiliary truck having a truck frame, laterally movable means for supporting said side frames on said auxiliary truck, an oscillation restraint mechanism including a universal joint, means including a bracket for restraining said universal joint against lateral movement with respect to said bolster, said bracket including vertically extending guide supports, guides secured to said guide supports, said universal joint including a yoke having guideways arranged to engage said guides, means including laterally extending flanges on said yoke chamfered toward each end and arranged to engage said guides for providing a pivotal connection between said guides and said guide shoes, vertically extending arcuate bearings formed in said yoke, openings between said arcuate bearings, a bearing block for said universal joint having bearing surfaces arranged to rotatably engage said arcuate bearings, a longitudinally extending bearing in said bearing block, means for providing a lubricant passage from the exterior of said yoke and communicating with said arcuate bearings in said yoke and with said longitudinally extending bearing in said bearing block, a rocker pin for said universal joint constructed and arranged so as to have a rotatable and longitudinally slidable engagement with said longitudinally extending bearing, and means including brace plates secured to said rocker pin and to said truck frame for rigidly securing said rocker pin to an end of said truck frame.

8. A locomotive or car having a superstructure, main side frames, a bolster extending between and connected to said side frames, means for supporting said superstructure on said bolster, a double axle auxiliary truck having a truck frame, laterally movable means for supporting said side frames on said auxiliary truck, an oscillation restraint mechanism including a universal non-load transferring joint having limited longitudinal and vertical movement with respect to said bolster, means including a bracket for restraining said universal joint against lateral movement with respect to said bolster, said bracket having vertically extending guides, said universal joint including a yoke having guide ways arranged to slidably engage said vertically extending guides, means including laterally extending flanges on said yoke chamfered toward each end and arranged to tiltably engage said vertically extending guides for providing a vertically pivotal connection therebetween, vertically extending arcuate bearings formed in said yoke, openings between said arcuate bearings, a bearing block for said universal joint having arcuate bearing surfaces arranged to rotatably engage said arcuate bearings, a longitudinally extending cylindrical bearing formed in said bearing block, means for providing a lubricant passage from the exterior of said yoke and communicating with said arcuate bearings in said yoke and with said longitudinally extending bearing in said bearing block, a rocker pin for said universal joint constructed and arranged so as to have a rotatable and longitudinally slidable engagement with said longitudinally extending bearing, and means for rigidly securing said rocker pin to an end of said truck frame.

9. A locomotive or car having a superstructure, main side frames, a bolster extending between and connecting said side frames, means for supporting said superstructure on said bolster, driving wheels and axles arranged to support a portion of said main side frames, a double axle auxiliary truck having a truck frame, means including a laterally movable center pin for supporting a portion of said main side frames on said auxiliary truck, an oscillation restraint radius rod including a laterally fixed universal non-load transferring joint having a longitudinally and vertically translatable connection to said bolster, means including a bracket for restraining said universal joint against lateral movement with respect to said bolster, said bracket including a pair of vertically extending guide supports, a tie bar interconnecting said guide supports, vertically extending guides secured to said guide supports, said universal joint including a yoke having vertically extending guideways arranged to slidably engage said vertically extending guides, means including laterally extending flanges on said yoke chamfered toward each end and arranged to tiltably engage said vertically extending guides for providing a vertically pivotal connection between said guides and said guideways, internal vertically extending arcuate bearings formed in said yoke, tapered longitudinally extending openings between said arcuate bearings, means including an oil hole extending through the upper portion of said yoke for providing a lubricating passage to said internal arcuate bearings, a bearing block for said universal joint having vertically extending arcuate bearing surfaces arranged to rotatably engage said arcuate bearings, a longitudinally extending cylindrical bearing extending through said bearing block, an oil hole and oil groove in said bearing block arranged to communicate with said oil hole in said yoke and to communicate with said vertically extending arcuate bearing surfaces and said cylindrical bearing, a cylindrical rocker pin for said universal joint constructed and arranged to make a rotatable and longitudinally slidable fit within said cylindrical bearing, said rocker pin having a bifurcated end engaging an end of said truck frame and being rigidly secured thereto, and means including brace plates secured to said rocker pin and to said truck frame for rigidly bracing said rocker pin with respect to said truck frame.

10. A universal joint including a connecting member having guides, a yoke having guideways arranged to engage said guides, said guideways including flanges chamfered toward each end and arranged to engage the sides of said guides, arcuate bearings formed in said yoke, an opening between said arcuate bearings, a bearing block having arcuate bearing surfaces arranged to rotatably engage said arcuate bearings, a cylindrical bearing formed in said bearing block, and a second connecting member having a cylindrical pin extending through said opening between said arcuate bearings and arranged to make a rotatable engagement with said cylindrical bearing.

11. A locomotive or car having a main supporting frame, an auxiliary truck having a frame, laterally movable means for supporting said main supporting frame on said auxiliary truck frame, and means including an oscillation restraint mechanism connected to an end of said auxiliary truck frame and having a laterally fixed and longitudinally and vertically translatable non-load transmitting connection to said main supporting frame, said non-load transmitting connection including a universal joint longitudinally fixed with respect to said main supporting frame.

OLE K. KJOLSETH.